> United States Patent Office
>
> 3,088,977
> Patented May 7, 1963

3,088,977
HEXACHLOROTETRAHYDROMETHANOINDENE AMINE COMPOUNDS
Edward Segel, Chicago, Ill., assignor to Velsicol Chemical Corporation, Chicago, Ill., a corporation of Illinois
No Drawing. Filed May 18, 1959, Ser. No. 813,661
6 Claims. (Cl. 260—563)

This invention relates to new chemical compositions of matter. More specifically, this invention relates to new chemical compounds of the formula

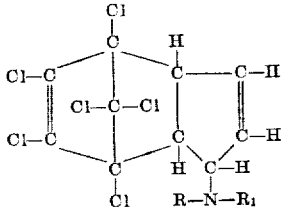

wherein R and $R_1$ are selected from the group consisting of hydrogen and the radicals $-(CH_2)_nCH_3$ $$-(CH_2)_xOH$$

$-(CH_2)_xY$, and $-(CH_2)_zSH$, $n$ is a whole number from 0 to 6, $x$ is a whole number from 2 to 7, $z$ is a whole number from 1 to 7, and Y is selected from the group consisting of chlorine and bromine. These compounds are useful as pesticides, particularly as fungicides and nematocides.

The new compounds of this invention can be prepared readily from the compound 1-bromo-4,5,6,7,8,8-hexachloro-3a,4,7,7a-tetrahydro-4,7-methanoindene, which will be referred to as Compound I for brevity. Compound I itself can be obtained by the bromination of 4,5,6,7,8,8-hexachloro-3a,4,7,7a-tetrahydro - 4,7 - methanoindene, the Diels-Alder adduct of hexachlorocyclopentadiene and cyclopentadiene as described, for example, by Riemschneider, Monatsh. 83, 802(1952). The bromination is preferably carried out in the presence of a small quantity (about 0.001 to 0.01 mole per mole of adduct) of an organic peroxide such as benzoyl peroxide, lauryl peroxide, or ascaridol. One mole of bromine or preferably a slight excess should be used for each mole of adduct. The bromine is added portionwise to the adduct, which is suitably dissolved in an inert solvent such as carbon tetrachloride, chloroform, carbon disulfide, tetrachloroethylene, or the like. Reaction temperatures between about normal room temperature and about 120° C. are suitable. After all the bromine has been added, the product can be isolated by distilling off the solvent and any excess bromine in vacuo. The yields of Compound I are nearly quantitative. While the Compound I obtained in this manner is often sufficiently pure to be used directly as a starting material in the preparation of the compounds of this invention, it can be purified, as by recrystallization from a suitable solvent such as hexane or pentane.

When both R and $R_1$ are hydrogen, the new compound of this invention is the primary amine 1-amino-4,5,6,7,8,8-hexachloro - 3a,4,7,7a - tetrahydro-4,7-methanoindene. This compound can be obtained, for example, by treating Compound I with a thiocyanate such as sodium or potassium thiocyanate and hydrolyzing the resulting isothiocyanate. The first reaction is preferably carried out with a slight excess of thiocyanate over the theoretically required one mole for each mole of Compound I. A relatively inert solvent or diluent such as acetone is used to facilitate the reaction, which can be carried out satisfactorily at temperatures between about normal room temperature and the reflux temperature of the solvent employed. The reaction is ordinarily complete in a few hours. The inorganic salts are then filtered off, and the product is isolated by distilling off the solvent in vacuo. The residue can be used directly in the next step in the synthesis, or it can be purified by recrystallization from a suitable solvent such as pentane. This intermediate isothiocyanate is then hydrolyzed in aqueous medium in the presence of a few percent by weight of a strong mineral acid such as hydrochloric acid. Although a solvent is not absolutely essential, the hydrolysis can be facilitated by the use of a relatively inert solvent or diluent such as dioxane. Reaction temperatures between about normal room temperature and the reflux temperature of the reaction mixture are satisfactory. When the hydrolysis is complete, the liquid components are distilled off in vacuo. The residue consists primarily of the acid salt of the desired primary amine. The free amine can be obtained by making the residue basic with an aqueous solution of base such as sodium or potassium hydroxide and then extracting the basic mixture with a water-immiscible organic solvent such as ether. The ether solution is then dried and filtered, and the ether is distilled off. While the residue of the desired primary amine obtained in this manner is often sufficiently pure for pesticidal use as such, if desired it can be purified, for example, by recrystallization from a suitable solvent such as pentane.

When one of R or $R_1$ is hydrogen and the other is one of the radicals listed above, the new compounds of this invention are secondary amines. These amines can be prepared by treating Compound I with the appropriate primary amines $H_2N(CH_2)_nCH_3$, $H_2N(CH_2)_xOH$, or $H_2N(CH_2)_zSH$, where $n$, $x$, and $z$ are as previously defined. While equimolar proportions of the reactants can be used, it is preferable to use an excess of up to about one mole of the amine reactant. In some cases, the amine reactant is a liquid at normal room temperature, so that no other solvents or diluents need be used. Similarly, some of the amine reactants are supplied commercially as aqueous solutions which can be used directly for reaction with Compound I in a two-phase system, which should be stirred thoroughly during the reaction. However, other inert solvents or diluents can be used to facilitate the reaction. The reaction temperature is not critical, but temperatures in the range from about normal room temperature to about the reflux temperature of the reaction mixture are preferred. The reactions can be carried out satisfactorily at normal atmospheric pressure, but super- or subatmospheric pressures can be used if desired. The length of time required for the reaction depends on many factors and will vary from a few minutes to a matter of hours. Similarly, the reaction mixture is worked up in a manner suitable to the physical properties of the reactants and the particular product. Generally, however, if the reaction has been carried out in an organic solvent, the hydrobromide of the primary amine used as starting material will have precipitated out and can be filtered off. The solvent is then distilled off from the filtrate in vacuo to leave a residue of the desired secondary amine and any unreacted Compound I. This residue is treated with an aqueous solution of a mineral acid such as hydrochloric acid and filtered. The filtrate is then made strongly basic with an aqueous solution of a base such as sodium or potassium hydroxide, and the mixture is extracted thoroughly with a water-immiscible organic solvent such as ether. The ether solution is then dried and filtered, and the ether is distilled off. While the residue is often sufficiently pure for pesticidal use as such, the desired secondary amine can be isolated in pure form by fractional distillation, recrystallization, or other techniques known to those skilled in the art.

Secondary amines according to this invention in which one of R or $R_1$ is a radical —$(CH_2)_nCH_3$ are prepared by the reaction of Compound I with methylamine, ethylamine, propylamine, butylamine, amylamine, hexylamine, or heptylamine. Amine products in which one of R or $R_1$ is a radical —$(CH_2)_xOH$ are prepared from Compound I and 2-aminoethanol, 3-aminopropanol, 4-aminobutanol, 5-aminopentanol, 6-aminohexanol, or 7-aminoheptanol. Similarly, amine products which contain the radical —$(CH_2)_zSH$ are prepared from Compound I and such amines as aminomethanethiol, 2-aminoethanethiol, 7-aminoheptanethiol, and the like.

Secondary amines according to this invention in which R or $R_1$ is a radical —$(CH_2)_xY$ can be obtained by treating the secondary amines containing a radical —$(CH_2)_xOH$ with a halogenating agent such as thionyl chloride or thionyl bromide. It is preferred to use a slight molar excess of the halogenating agent, which is added portionwise to the hydroxyamine, which can be mixed with a suitable solvent or diluent. In many cases the reaction is exothermic, and no external heat need be applied. In general, reaction temperatures between about normal room temperature and the reflux temperature of the reaction mixture are satisfactory. When all the halogenating agent has been added, the mixture can be heated for a short time to complete the reaction. The reaction mixture is then cooled, and the excess halogenating agent is destroyed, as by the careful addition of methanol. The liquid components are then distilled off in vacuo, and the residue is worked up as desecribed above to isolate the desired halogenated secondary amine.

When both R and $R_1$ are selected from among the radicals —$(CH_2)_nCH_3$, —$(CH_2)_xOH$, —$(CH_2)_zSH$, and —$(CH_2)_xY$, the new compounds according to this invention are tertiary amines. These amines can be prepared from Compound I in the manner described above for the preparation of the secondary amines, except that the starting materials are now the appropriate secondary amines such as $HN[(CH_2)_nCH_3]_2$, $HN[(CH_2)_xOH]_2$, or $HN[(CH_2)_zSH]_2$. Thus, compounds according to this invention in which both R and $R_1$ are the same radical —$(CH_2)_nCH_3$ are prepared from Compound I and dimethylamine, diethylamine, dipropylamine, dibutylamine, diamylamine, dihexylamine, or diheptylamine. Similarly, compounds in which R and $R_1$ are the same radical containing —OH or —SH groups can be prepared from the corresponding substituted secondary amines such as 2,2'-iminodiethanol (diethanolamine), 3,3'-iminopropanol, 2,2'-iminodiethanthiol, and the like. Products according to this invention in which R and $R_1$ are radicals —$(CH_2)_xY$ are prepared from the corresponding hydroxy compounds and thionyl chloride or thionyl bromide as described above. R and $R_1$ in the tertiary amines of this invention need not be identical, since mixed secondary amines such as N-methylethylamine, N-ethylpropylamine, N-methylpropylamine, N-methylbutylamine, N-ethylbutylamine, N-propylbutylamine, N-hexylheptylamine, and the like can also be used as starting materials.

In addition to the free amines which have been particularly described above, this invention also embraces these new compounds in the form of their acid salts and quaternary ammonium salts. The acid salts can be prepared readily by treating the free amines dissolved in an inert organic solvent such as ether with acids such as hydrochloric acid, hydrobromic acid, sulfuric acid, phosphoric acid, tartaric acid, and the like. The amine salts are ordinarily sparingly soluble inorganic solvents and can simply be filtered off, washed with more organic solvent, and dried. The acid amine salts can also be prepared by treating the free amines with anhydrous hydrogen halides such as hydrogen chloride, hydrogen bromide, and the like in organic solvents. Quaternary ammonium salts can be formed by the alkylation of the amines of this invention with such alkylating agents as alkyl halides, sulfates, and sulfonates. The salts of the tertiary amines ordinarily form readily from the amine and the alkylating agent when they are allowed to stand at room temperature in a nonpolar solvent such as benzene or xylene. Formation of the quaternary salts from the primary amine or secondary amines requires the presence of a base such as sodium carbonate. The quaternary salts are ordinarily very insoluble in nonpolar solvents and precipitate out as they form; hence they can simply be filtered off, washed, and dried. Typical examples of quaternary ammonium salts are those formed by the addition of the amines of this invention, especially the tertiary amines, to alkyl halides such as methyl iodide, methyl bromide, ethyl chloride, ethyl bromide, ethyl iodide, propyl bromide, isopropyl iodide, butyl chloride, butyl bromide, isobutyl iodide, and the like.

The manner in which the new compounds of this invention can be prepared is illustrated in the following examples.

EXAMPLE 1

*Preparation of 1-Bromo-4,5,6,7,8,8-Hexachloro-3a,4,7,7a-Tetrahydro-4,7-Methanoindene*

(COMPOUND I)

4,5,6,7,8,8 -hexachloro - 3a,4,7,7a - tetrahydro - 4,7-methanoindene (33.89 g.; 0.1 mole), 0.1 g. benzoyl peroxide, and 50 ml. carbon tetrachloride were placed in a 150-ml., three-necked, round-bottomed flask fitted with a heating mantle, mechanical stirrer, internal thermometer, reflux condenser, and a tared 10-ml. burette. Bromine (16.98 g.; 0.100 mole) was weighed into the burette. The mixture in the flask was stirred and heated to a temperature of 70–72° C., whereupon the heat was reduced and bromine was added over a period of 30 minutes at a rate of about 0.2 ml./minute at a temperature of 68–72° C. The mixture was stirred for an additional 10 minutes at 70° C. and transferred to a 500-ml. round-bottomed flask. The solvent was distilled off in vacuo, to leave a residual oil, which was disolved in 50 ml. hexane. The solvent was again distilled off in vacuo to leave an oil, which was dissolved while still warm in 50 ml. pentane. The pentane mixture was swirled under a vacuum without heating, under which conditions the product separated in micro crystals. The white powder was dried thoroughly in a vacuum oven to give 42 g., the theoretical yield, of 1-bromo-4,5,6,7,8,8-hexachloro - 3a,4,7,7a - tetrahydro - 4,7 - methanoindene, melting point 64–66° C.

EXAMPLE 2

*Preparation of 1-Amino-4,5,6,7,8,8-Hexachloro-3a,4,7,7a-Tetrahydro-4,7-Methanoindene*

Compound I (84 g.; 0.20 mole) was placed in a 1-liter, three-necked, round-bottomed flask fitted with a mechanical stirrer, reflux condenser, and internal thermometer. A slurry of potassium thiocyanate (29.2 g.; 0.31 mole) in 400 ml. of acetone was then added, and the mixture was stirred and refluxed at a temperature of 57° C. for 2 hours. The cooled reaction mixture was filtered with suction to remove inorganic salts, and the acetone was distilled from the filtrate in vacuo. The residue was recrystallized from pentane to give 46 g. of crystalline product. This solid was disolved in 200 ml. dioxane and mixed with 20 ml. of concentrated hydrochloric acid in a 500-ml., two-necked, round-bottomed flask fitted with a mechanical stirrer and reflux condenser. The mixture was refluxed for 28 hours at 89° C., after which the dioxane-water mixture was distilled off in vacuo. The solid residue was triturated several times with ether, and the residue was then made basic with 10% aqueous sodium hydroxide solution. The aqueous mixture was extracted with ether; and the ether extract was boiled with activated charcoal (Nuchar 190 CN), filtered, and dried over anhydrous magnesium sulfate. The ether was then evaporated from the filtered solution to give a solid residue, which was recrystallized from pentane to yield 19.5 g. (30.8% of theory) of 1-amino - 4,5,6,7,8,8 - hexachloro - 3a,4,7,7a - tetrahydro-4,7-methanoindene, melting point 135–138° C.

EXAMPLE 3

Preparation of the Dimethylamine

Compound I (11 g.; 0.026 mole) and dimethylamine (29 g.; 0.64 mole) as 125 ml. of a 25% aqueous solution (d 15/15 0.933) were placed in a round-bottomed flask fitted with a mechanical stirrer and stirred for 15 hours at room temperature. The solid was filtered off, washed several times with warm water until the odor of amine was gone, sucked dry, and dried completely over anhydrous calcium chloride in vacuo. The dried solid (9.1 g.; M.P. 117–20°) was recrystallized with chilling from a 1:3 mixture of petroleum ether-hexane to give 5.0 g. of white crystalline 1-N,N-dimethylamino-4,5,6,7,8,8 - hexachloro - 3a,4,7,7a - tetrahydro - 4,7-methanoindene, melting point 123–125° C.

A mixture of this dimethylamine (6.5 g.) and methyl iodide (3.5 g.) dissolved in benzene was allowed to stand at room temperature overnight. The thick, white slurry which formed was filtered, and the solid was washed twice with benzene and then dried over paraffin in vacuo. The dry solid was treated with activated charcoal and recrystallized from isopropanol to give 3.6 g. of the yellow quaternary ammonium iodide, which decomposed without melting when heated. The salt was soluble in hot water, acetone, and ethanol but was insoluble in carbon tetrachloride and hexane. It formed a precipitate with silver nitrate in aqueous solution.

EAMPLE 4

Preparation of the Diethanolamine

A mixture of Compound 1 (10.5 g.; 0.021 mole) and diethanolamine (5.5 g.; 0.052 mole) was refluxed for 36 hours in 50 ml. anhydrous ether. The reaction mixture was extracted with water and ether, and the ether layer was washed several times with water until the washings no longer gave a test for bromide ion with silver nitrate. The ether layer was then dried over anhydrous sodium sulfate and filtered. The ether was evaporated off to leave 10.5 g. of light yellow, waxy 1-N,N-di($\beta$-hydroxyethyl)amino - 4,5,6,7,8,8-hexachloro-3a,4,7,7a-tetrahydro-4,7-methanoindene.

A similar reaction was carried out in benzene solution. The reaction mixture was extracted with water and benzene; and the benzene solution was dried over anhydrous sodium sulfate, filtered, and reduced to about half its volume by distillation of some of the benzene. About two-thirds its volume of hexane was added, after which benzene saturated with dry hydrogen chloride was added slowly until the mixture was acidic. The mixture was chilled for several hours, and the precipitated solid was filtered off and dried to give the amine hydrochloride, melting point 209–212° C. (decomposition) after sintering at 205.5° C.

EXAMPLE 5

Preparation of the Di($\beta$-Chloroethyl)Amine

The diethanolamine prepared in the previous example (10.5 g.) was dissolved in 35 cc. of chloroform in a 100-cc., three-necked, round-bottomed flask fitted with a mechanical stirrer, reflux condenser, and dropping funnel. Thionyl chloride (8.3 g.) was then added dropwise with stirring. After all the thionyl chloride had been added (mild exothermic reaction), the mixture was brought to reflux for a few minutes over a boiling water bath, and the excess thionyl chloride was destroyed by the slow addition of methanol. The solvents were then distilled off in vacuo, and the residue was dissolved out with methanol. After the methanol had been distilled off, the residue was dissolved in 90 cc. of isopropanol and treated with 15 cc. of hexane. The solid which separated (6.6 g.) was filtered off and recrystallized from isopropanol to give 2.05 g. of 1-N,N-di($\beta$-chloroethyl)amino-4,5,6,7,8,8-hexachloro-3a,4,7,7a - tetrahydro - 4,7-methanoindene, melting point 200–203.5° C.

A wide variety of other useful compounds within the scope of this invention can be prepared in the manner detailed in the paragraphs above. Given in the following illustrative examples are the reactants required to give the indicated named new compounds of this invention.

EXAMPLE 6

Compound I+methylamine=1-N-methylamino-4,5,6,7,8,8-hexachloro-3a,4,7,7a-tetrahydro-4,7-methanoindene.

EXAMPLE 7

Compound I+heptylamine=1-N-heptylamino-4,5,6,7,8,8-hexachloro-3a,4,7,7a-tetrahydro-4,7-methanoindene.

EXAMPLE 8

Compound I+butylamine=1-N-butylamino-4,5,6,7,8,8-hexachloro-3a,4,7,7a-tetrahydro-4,7-methanoindene.

EXAMPLE 9

Compound I+2-aminoethanol=1-N-($\beta$-hydroxyethyl)-amino-4,5,6,7,8,8-hexachloro-3a,4,7,7a - tetrahydro - 4,7 - methanoindene.

EXAMPLE 10

Compound I+7-aminoheptanol=1-N-(7'-hydroxyheptyl)amino - 4,5,6,7,8,8-hexachloro - 3a,4,7,7a - tetrahydro-4,7-methanoindene.

EXAMPLE 11

Compound I+4-aminobutanol=1-N-(4'-hydroxybutyl)amino-4,5,6,7,8,8-hexachloro-3a,4,7,7a - tetrahydro - 4,7 - methanoindene.

EXAMPLE 12

Compound I+aminomethanethiol=1-N-mercaptomethylamino-4,5,6,7,8,8-hexachloro-3a,4,7,7a-tetrahydro - 4,7 - methanoindene.

EXAMPLE 13

Compound I+7-aminoheptanethiol=1-N-(7'-mercaptoheptyl)amino-4,5,6,7,8,8-hexachloro-3a,4,7,7a - tetrahydro-4,7-methanoindene.

EXAMPLE 14

Compound I+2-aminoethanethiol=1-N-($\beta$-mercaptoethyl)amino-4,5,6,7,8,8-hexachloro-3a,4,7,7a - tetrahydro-4,7-methanoindene.

EXAMPLE 15

1-N-($\beta$-hydroxyethyl)amino-4,5,6,7,8,8-hexachloro - 3a,4,7,7a-tetrahydro-4,7-methanoindene+SOCl$_2$=1-N - ($\beta$ - chloroethyl)amino-4,5,6,7,8,8-hexachloro - 3a,4,7,7a - tetrahydro-4,7-methanoindene.

EXAMPLE 16

1-N-(7'-hydroxyheptyl)amino-4,5,6,7,8,8 - hexachloro - 3a,4,7,7a-tetrahydro-4,7-methanoindene+SOBr$_2$=1 - N - (7'-bromoheptyl)amino-4,5,6,7,8,8-hexachloro-3a,4,7,7a - tetrahydro-4,7-methanoindene.

EXAMPLE 17

Compound I+dibutylamine=1-N,N-dibutylamino-4,5,6,7,8,8-hexachloro-3a,4,7,7a-tetrahydro - 4,7 - methanoindene.

EXAMPLE 18

Compound I+diheptylamine=1-N,N-diheptylamino-4,5,6,7,8,8-hexachloro-3a,4,7,7a-tetrahydro-4,7 - methanoindene.

EXAMPLE 19

Compound I+3,3'-iminopropanol=1-N,N-di - (γ-hydroxypropyl)amino-4,5,6,7,8,8-hexachloro-3a,4,7,7a-tetrahydro-4,7-methanoindene.

EXAMPLE 20

Compound I+2,2'-iminodiethanethiol=1-N,N - di(β-mercaptoethyl)amino - 4,5,6,7,8,8 - hexachloro-3a,4,7,7a-tetrahydro-4,7-methanoindene.

EXAMPLE 21

1-N,N-di(γ-hydroxypropyl)amino - 4,5,6,7,8,8 - hexachloro-3a,4,7,7a-tetrahydro-4,7- methanoindene+$SOBr_2$= 1-N,N-di(γ-bromopropyl)amino-4,5,6,7,8,8 - hexachloro-3a,4,7,7a-tetrahydro-4,7-methanoindene.

EXAMPLE 22

Compound I+N-methylethylamine=1-N-methyl - N - ethylamino-4,5,6,7,8,8-hexachloro-3a,4,7,7a - tetrahydro-4,7-methanoindene.

EXAMPLE 23

Compound I+N-hexylheptylamine=1-N-hexyl-N-heptylamino - 4,5,6,7,8,8-hexachloro-3a,4,7,7a-tetrahydro-4,7-methanoindene The utility of the compounds of this invention as pesticides was illustrated in a variety of experiments. For example, experiments on the toxicity of candidate compounds to test spores of fungi were carried out by the slide germination technique adopted by the Committee on Standardization of Fungicidal Tests of the American Phytopathological Society. Measured concentrations of spores were placed on glass slides in contact with various concentrations of the compounds being tested. The percentage germination of spores was then determined for each treatment after 20 hours' incubation at 72° F. Two replicates were run at each concentration. The results obtained in these tests with the product of Example 2, namely, 1-amino-4,5,6,7,8,8-hexachloro-3a,4,7,7a-tetrahydro-4,7-methanoindene, are presented in the table below.

| Concn., p.p.m. | Organism | Percent Spore Germination | | | $ED_{50}$[1], p.p.m. |
|---|---|---|---|---|---|
| | | Rep. 1 | Rep. 2 | Ave. | |
| 100 | Fusarium roseum | 0 | 0 | 0 | 32 |
| 100 | Monilinia fructicola | 0 | 0 | 0 | 9 |
| 1,000 | Stemphylium sarcinaeforme | 0 | 0 | 0 | 80 |

[1] Dosage effective for 50% control.

Experiments were also carried out for the protectant control of the bean rust. Pinto bean seedlings grown under greenhouse conditions, were mounted on a special compound turntable and sprayed with the respective compounds at various concentrations for 30 seconds at 30 pounds pressure. The plants were allowed to dry, inoculated with the bean rust organism (*Uromyces phaseoli*), and placed in an incubation chamber for 24 to 48 hours. The plants were then removed and maintained under greenhouse conditions for 10 to 14 days. The number of rust pustules on the leaves of each plant were then determined. Several replicates were run at each concentration. The results obtained with the product of Example 2 are shown in the following table.

| Concn., p.p.m. | No. Pustules per Plant | | | | Percent Control | $ED_{95}$, p.p.m. |
|---|---|---|---|---|---|---|
| | Rep. 1 | Rep. 2 | Total | Ave. | | |
| 100 | 1 | 4 | 5 | 3 | 90 | >100 |
| Control | | | | 30 | | |

Antifungal experiments were also carried out with the dimethylamine and its quaternary salt with methyl iodide as described in Example 3. When tested under the conditions of the Schmitz test in acetone solution with a malt extract agar medium, the free dimethylamine retarded the growth of *Aspergillus niger* at concentrations as low as 0.08%. In the same experiment, the methyl iodide quaternary salt of this amine showed retardation of fungal growth in aqueous solutions at concentrations from 0.01 to 0.04%.

Experiments were also carried out for the control of soil nematodes. Acetone solutions of the test compounds were dispersed in water to an acetone content not to exceed 4% by volume, and 4.5 ml. of each were placed in appropriate 20 x 75 mm. vials. From 150 to 200 nematodes (*Panagrellus redivivus*), 0.5 ml. by volume, were then introduced into the test solutions. Test vials for one compound only with an additional vial of water and nematodes only were then placed in an individual water-sealed moisture chamber. Vapor phase toxicity was determined by mortality induced in the water-nematode vial. Contact toxicity was determined by mortality induced in the test compound vials per se. The results were interpreted as percent living nematodes after various periods of exposure. In these experiments, the primary amine product of Example 2 showed no living nematodes in 24 hours at a concentration of 100 p.p.m., while all the nematodes were still alive after 72 hours in an untreated control.

While the outstanding utility of the new compounds of this invention is as pesticides, other uses will be evident to those skilled in the art. The reactive amino group in these compounds makes them useful as intermediates for the synthesis of a wide variety of chemical compounds for use as pharmaceuticals, resin modifiers, and the like. For example, these compounds are well suited as curing agents for epoxy resins, where they have the advantage of imparting the flame-proofing qualities of their high chlorine content to the resins.

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 24

*Preparation of an Emulsifiable Concentrate*

The following ingredients are blended thoroughly until a homogeneous liquid concentrate is obtained. This concentrate is mixed with water to give an aqueous dispersion containing the desired concentration of active compound for use as a spray.

1-amino-4,5,6,7,8,8 - hexachloro-3a,4,7,7a-tetrahydro-
4,7-methanoindene _____ 25
Sodium lauryl sulfate _____ 2
Sodium lignin sulfonate _____ 3
Kerosene _____ 70

EXAMPLE 25

*Preparation of a Wettable Powder*

The following components are mixed intimately in conventional mixing or blending equipment and are then ground to a powder having an average particle size of less than about 50 microns. The finished powder is dispersed in water to give the desired concentration of active compound.

1 - N,N - dimethylamino - 4,5,6,7,8,8 - hexachloro-
3a,4,7,7a-tetrahydro-4,7-methanoindene _____ 75.00
Fuller's earth _____ 22.75
Sodium lauryl sulfate _____ 2.00
Methyl cellulose _____ .25

EXAMPLE 26

*Preparation of an Oil-Dispersible Powder*

The following components are blended and ground as described in the previous example to give a powder which can be dispersed in oil to form a spray containing the desired concentration of active compound.

1 - N,N - di($\beta$ - hydroxyethyl)amino-4,5,6,7,8,8-hexachloro-3a,4,7,7a-tetrahydro-4,7-methanoindene ____ 70
Condensation product of diamylphenol with ethylene oxide _____ 4
Fuller's earth _____ 26

EXAMPLE 27

*Preparation of a Dust*

The following ingredients are mixed thoroughly and then ground to an average particle size of less than about 50 microns to give a dust suitable for application with conventional dusting equipment.

1 - N,N - di($\beta$ - chloroethyl)amino-4,5,6,7,8,8-hexachloro-3a,4,7,7a-tetrahydro-4,7-methanoindene ____ 20
Talc _____ 80

EXAMPLE 28

*Preparation of a Granular Formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

1-N-($\beta$-mercaptoethyl)amino-4,5,6,7,8,8 - hexachloro-
3a,4,7,7a-tetrahydro-4,7-methanoindene _____ 10
Fuller's earth _____ 66
Dextrin _____ 20
Sodium lignin sulfonate _____ 3
Kerosene _____ 1

When the compounds of this invention are used as nematocides to control or prevent infestations of destructive nematodes, they are ordinarily used as soil treatments. Plant parasitic nematodes occur in enormous numbers in all kinds of soil in which plants can grow, and many plant pathologists believe that all the crop and ornamental plants grown in the world can be attacked by these nematodes. The destructive species of nematodes range from the highly specialized, which attack only a few kinds of plants, to the polyhagous, which attack a great many different plants. The plants almost invariably become infected by nematodes that move into them from the soil. The underground parts of plants, roots, tubers, corns, and rhizomes are thus more apt to be infected than above-ground parts, but infection of stems, leaves, and flower parts is also fairly common.

Damage to plants attacked by nematodes is due primarily to the feeding of the nematodes on the plant tissues. The nematodes may enter the plant to feed, may feed from the outside, or be only partially embedded. The feeding of a nematode may kill the cell or may simply interfere with its normal functioning. If the cell is killed, it is often quickly invaded by bacteria or fungi. If the cell is not killed, it and the adjacent cells may be stimulated to enlarge or multiply. Hence the most common types of nematode damage are manifest as rotting of the attacked parts and adjacent tissue or the development of galls and other abnormal growths. Either can interfere with the orderly development of the plant and cause shortening of stems or roots, twisting, crinkling or death of parts of stems and leaves, and other abnormalities. Consequently, the yield of crop plants is reduced, while a high-quality crop cannot be produced from the crippled plants.

The use of the compounds of this invention for nematode control can make the difference between a good crop and one not worth harvesting. Once the nematodes are controlled, yield increases of 25 to 50 percent are not uncommon. The solid or liquid nematocidal compositions of this invention can be applied to the soil, or in some cases to the plants and soil, in any convenient manner. While broadcast applications to the soil before planting by conventional plow or disc methods are effective, specialized methods such as row placement application, split-dosage applications, post-planting sidedress applications, and the like are also useful. The active compounds of this invention are applied in amounts sufficient to exert the desired nematocidal action. The amount of the active compound present in the pesticidal compositions as actually applied for preventing or controlling pest infestations varies with the type of application, the particular species which are to be controlled, the purpose for which the treatment is made, and the like. Generally, the solid or liquid pesticidal compositions of this invention will contain from about 0.5% to about 90% of the active compounds.

I claim
1. A compound selected from the group consisting of compounds of the formula

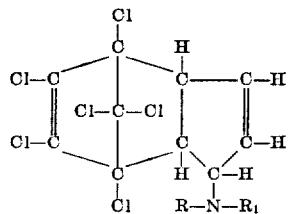

wherein R and $R_1$ are independently selected from the group consisting of hydrogen and the radicals —$(CH_2)_nCH_3$, —$(CH_2)_xOH$, —$(CH_2)_xY$ and —$(CH_2)_zSH$, $n$ is a whole number from 0 to 6, $x$ is a whole number from 2 to 7, $z$ is a whole number from 1 to 7, and Y is selected from the group consisting of chlorine and bromine, their acid salts with an acid selected from the group consisting of hydrochloric acid, hydrobromic acid, sulfuric acid, phosphoric acid, and tartaric acid; and their quaternary ammonium salts with an alkylating agent selected from the group consisting of alkyl halides, alkyl sulfates, and alkyl sulfonates.

2. 1-amino-4,5,6,7,8,8-hexachloro - 3a,4,7,7a - tetrahydro-4,7-methanoindene.

3. 1 - N,N - dimethylamino - 4,5,6,7,8,8 - hexachloro-3a,4,7,7a-tetrahydro-4,7-methanoindene.

4. 1 - N,N - di(β - hydroxyethyl)amino - 4,5,6,7,8,8-hexachloro-3a,4,7,7a-tetrahydro-4,7-methanoindene.

5. 1 - N,N - di(β - chloroethyl)amino - 4,5,6,7,8,8-hexachloro-3a,4,7,7a-tetrahydro-4,7-methanoindene.

6. 1 - N - (β - mercaptoethyl)amino - 4,5,6,7,8,8 - hexachloro-3a,4,7,7a-tetrahydro-4,7-methanoindene.

References Cited in the file of this patent
UNITED STATES PATENTS

| | | |
|---|---|---|
| 2,616,928 | Gilbert et al. | Nov. 4, 1952 |
| 2,671,043 | Gilbert | Mar. 2, 1954 |
| 2,673,172 | Polen et al. | Mar. 23, 1954 |
| 2,744,924 | Herzfeld | May 8, 1956 |
| 2,894,987 | Stein et al. | July 14, 1959 |
| 2,907,793 | Craig | Oct. 6, 1959 |
| 2,909,458 | Richter | Oct. 20, 1959 |
| 2,912,356 | Schmerling | Nov. 10, 1959 |
| 2,921,958 | Feichtinger | Jan. 19, 1960 |
| 2,946,817 | Molotsky | July 26, 1960 |

UNITED STATES PATENT OFFICE

CERTIFICATE OF CORRECTION

Patent No. 3,088,977 May 7, 1963

Edward Segel

It is hereby certified that error appears in the above numbered patent requiring correction and that the said Letters Patent should read as corrected below.

Column 1, line 24, strike out "$-(CH_2)_xOH$"; line 25, before "$-(CH_2)_xY$" insert -- ,$-(CH_2)_xOH$, --; column 3, line 70, for "inorganic" read -- in organic --; column 4, line 33, for "16.98" read -- 16.08 --; column 10, line 29, for "polyhagous" read -- polyphagous --.

Signed and sealed this 19th day of November 1963.

(SEAL)
Attest:

ERNEST W. SWIDER

Attesting Officer

EDWIN L. REYNOLDS

Acting Commissioner of Patents